United States Patent [19] … [11] 3,881,024
Pahoundis, Sr. et al. … [45] Apr. 29, 1975

[54] EXTRUDED RUMINANT FODDER COMPRISING FIBROUS PLANT MATERIAL AND GELATINIZABLE BINDER

[75] Inventors: James T. E. Pahoundis Sr., North Ridgeville; Maurice A. Williams, Brookpark; Hans R. Strop, Lakewood, all of Ohio

[73] Assignee: International Basic Economy Corporation, New York, N.Y.

[22] Filed: Dec. 22, 1972

[21] Appl. No.: 317,713

[52] U.S. Cl. ............ 426/578; 426/74; 426/285; 426/272; 426/615; 426/623; 426/635; 426/807; 426/656; 426/516
[51] Int. Cl. ................................................. A23k 1/14
[58] Field of Search ....... 426/2, 141, 146, 147, 167, 426/210, 272, 807, 346, 348, 349

[56] References Cited
UNITED STATES PATENTS

| | | | |
|---|---|---|---|
| 1,877,266 | 9/1932 | Chapin et al. | 259/9 |
| 2,223,904 | 12/1940 | Zentz et al. | 426/374 |
| 2,971,843 | 2/1961 | Templeton | 426/54 |
| 3,119,691 | 1/1964 | Ludington et al. | 426/346 |
| 3,163,579 | 12/1964 | Derivan | 426/218 |
| 3,420,671 | 1/1969 | Hess et al. | 426/147 |
| 3,642,489 | 2/1972 | Bartley et al. | 426/516 |

Primary Examiner—Norman Yudkoff
Assistant Examiner—Curtis P. Ribando
Attorney, Agent, or Firm—Lawrence W. Flynn

[57] ABSTRACT

A chewy, particular animal fodder for ruminants is prepared by blending fibrous plant materials with a gelatinizable binder while the binder is in a substantially non-gelatinized condition, and subjecting the mixture to controlled conditions of temperature, moisture and pressure effective to gelatinize the binder while simultaneously intimately mixing the fibrous plant material and gelatinized binder and forming therefrom a viscous coherent fluid mass. The mass is extruded, pressed or otherwise formed into particles which are then dried to produce an animal fodder of high nutrient value.

The gelatinization of the binder, the mixing of the gelatinized binder with the fibrous plant material, and the formation of the particles from the resulting mixture are accomplished in essentially a single processing step using but one piece of equipment. The moisture required for gelatinization can be derived solely from the moisture in the fibrous plant material or can be externally supplied to the mixture of plant material and binder, such as by treating the mixture directly with water or steam. The fodder can be prepared in various types of commercially available extruders and similar equipment.

20 Claims, No Drawings

EXTRUDED RUMINANT FODDER COMPRISING FIBROUS PLANT MATERIAL AND GELATINIZABLE BINDER

BACKGROUND OF THE INVENTION

This invention related to a particulate animal fodder and to a process for its preparation which employs a separate binder component to hold the fodder in its particulate form.

The growers and producers of animal fodder are faced with numerous problems. Some typical problems are conveniently illustrated by briefly discussing alfalfa, a major fodder crop in the United States. Alfalfa is a desirable fodder because it contains vitamin A, 14 to 20 percent protein, and adequate roughage in the form of crude fiber.

Dried, storable alfalfa products are normally prepared in three basic forms (1) sun cured hay; (2) dehydrated pellets; and (3) alfalfa cubes. Sun cured hay is obtained by cutting the alfalfa, "windrowing" it in the field to dry in the sun, and then baling it. Because of its long stem fibers, sun cured hay is an excellent fodder for cattle, horses, sheep, goats and other grazing animals. However, this method of production is primitive and wasteful of alfalfa. For example, many harvests of alfalfa are lost because of rain while it is drying in the field. There is also a loss in the quality of the alfalfa because bits of the leaves, which are rich in nutrients, become brittle during drying and break off and fall to the ground when the bales are formed. As a result, sun cured hay has only about 75 percent of the protein and other nutrients originally present in the alfalfa. In addition, there are many areas where alfalfa cannot be sun cured because weather conditions do not permit drying the crop in the field. Another problem with sun cured hay is that the bales are bulky and do not lend themselves to continuous handling equipment. They therefore require much hand labor at the feed lot.

Over the past 40 years techniques have been developed to dry alfalfa artificially in central processing plants. This produces the second type of alfalfa product — the dehydrated pellets ("dehy pellets"). The alfalfa is brought fresh from the field into the dehydrating plant where it is dried in rotary drum dryers, ground into a meal, and then formed into pellets. The grinding, however, destroys the long stem fibers or roughage that grazing animals, particularly the ruminants, require for proper functioning of their digestive systems. As a result, dehy pellets are not used as fodder. They are used merely as a nutrient source in all types of animal feeds.

Cubing, the third method of preparing alfalfa products, employs either field drying or drum drying as a preliminary step before the cubes are made. If field drying (which is probably the most widespread practice today) is used, the process is subject to the same degree of nutrient loss as sun cured alfalfa bales. If the alfalfa is drum dried, there is a similar loss. Rotary drum dryers have been designed for maximum possible throughput and therefore operate at short residence times under high temperatures and high air flows. The high temperatures can damage the thin leafy portions of the alfalfa which are rich in nutrients, and the high air flow causes a loss of fine particles from the process constituting an air pollution problem as well as a loss of product. In addition, the cubes, although possessing the desired fiber length and being in an easily handled form, are hard and dense and difficult for the animal to chew. The cubes, therefore, need to be broken up at the feed lot before they are fed to livestock. This, of course, is a disadvantage.

The cost of drying is of major importance in the preparation of cubes and dehy pellets since fresh cut alfalfa may contain up to 85 percent or more initial moisture. This constitutes another drawback of such products.

The present invention produces a superior alfalfa fodder which does not rely on field drying; it is artificially dried under gentle drying conditions and produces a small free flowing particle which can be conveyed by continuous handling equipment. The resulting product is not hard and dense and, therefore, can be fed without any pretreatment directly to the animal. In the fodder of this invention, there is minimum loss and degradation of the nutritive values of the alfalfa with the result that the fodder has a higher protein and vitamin A content than most of the commercial fodders now produced. These advantages are obtained while simultaneously preserving the long stem fibers or roughage so essential in an animal fodder.

The above discussion, although in terms of alfalfa, is representative of similar problems encountered with other animal fodder materials which, as discussed below, are also benefited by the present invention and fall within its scope.

Numerous approaches have been used to form fodder into particulate forms such as cubes and dehy pellets. These processes generally involve subjecting the fodder to pressure to compact it into pellets either with or without a tacky binder to assist in holding the fodder together in the pellet. The present invention involves the use of a binder with the fodder but adapts a unique and novel approach as compared to the prior art processes. What follows is a brief discussion os what is believed to be some of the more relevant prior art in this regard.

U.S. Pat. No. 3,420,671 to Hess et al. describes the use of carbohydrates or vegetable binders with a relatively dry, finely divided plant material such as crushed and ground dehydrated alfalfa meal to produce a high density animal feed pellet. The binders are rendered adhesive by an enzyme treatment. After the binder has been activated in a separate piece of equipment, it is admixed with dry alfalfa meal in conventional equipment where the preconditioned binder and meal are mixed under pressure to produce a pellet.

U.S. Pat. No. 3,288,051 to Dodgen et al. describes a process for pelletizing dried and finely ground hay by physically blending the ground hay with a hot molasses binder and then shaping the resulting mixture into dense pellets.

U.S. Pat. No. 3,035,920 to Knodt describes the preparation of animal feed pellets using waste liquors derived from the digestion of plant products such as wood as the binder. One such binder is an alkaline earth base spent sulfite liquor. The binder and the finely ground and dried feed are mixed and then directly treated with steam prior to pelletizing to raise the moisture content of the blend to 10–20 percent and its temperature to between 50° and 150°F. The blend is then pelletized.

U.S. Pat. No. 1,877,266 to Chapin et al. describes the preparation of animal feed granules for chickens and such by mixing together ground corn, milo, oats, starches and other ground materials of carefully controlled moisture content (5 to 15 percent) and fine particle size and then passing them through a first mixing chamber having a worm feed screw where the blend is heated by an external steam jacket to gelatinize the binder elements in the mixture and soften them. The heated mixture is then fed to a separate piece of equipment where it is further mixed under very high pressure and extruded to form the product.

U.S. Pat. No. 422,370 to Brott describes blending together ground animal feed ingredients such as bran, potatoes, oats, corn, etc., in a mixing apparatus and then treating them directly with steam to heat them and render the starchy ingredients adhesive to bind the mixture together. Alternatively, the mixture is wetted with water and then heated with dry heat. The pretreated mixture is then placed in a compressing machine from which feed blocks of the required size and density are prepared.

The above prior art relies upon a binder to hold the pellet together. There is also prior art in which no binder is required to form the feed pellet. For example, in U.S. Pat. No. 2,786,760 to Bonnafoux, finely ground edible material such as moistened alfalfa is processed under pressures up to 10,000 p.s.i. and temperatures of 125° to 210°F. to render the material semiplastic. No binder is used although moisture is said to facilitate the agglomeration of the ground material. The treated material is formed into pellets.

In U.S. Pat. No. 3,527,642 to Harrison, et al. waste products of vegetable and animal origin are cooked at temperatures between 210° to 250°F. without a binder. The cooked mass is then formed into pellets. Small amounts of molasses can be added to improve the flavor of the product.

U.S. Pat. No. 2,971,843 to Templeton describes an animal food stuff prepared by soaking a mixture of ground food ingredients containing starches and proteins in water at a temperature below that at which starch gelatinizes and protein conversion occurs. This is done to dissolve out the water soluble ingredients. The mixture is then cooked at 180°F. or above to gelatinize the starch and convert the proteins. The cooked mixture is dried into sheets which are broken into particles suitable for feeding to animals.

It is a general disadvantage of the prior art products mentioned above that, because of the ground or non-fibrous nature of the food ingredients in them, they do not contain sufficient roughage to be useful as a fodder for ruminants. Another disadvantage of many of these products is their high density and coherency which makes it difficult for an animal to chew them without first fracturing the product.

It is, therefore, an object of the present invention to provide a particulate ruminant fodder of fibrous plant material and a gelatinized binder which is soft enough to be chewed by an animal, small enough to permit the use of continuous handling equipment, strong enough to permit processing without undue disintegration, and which contains a substantial proportion of the nutritive and roughage values of the original ingredients.

It is another object of this invention to provide a process for preparing such a fodder in which the nutritive and roughage values of the original plant ingredients are not substantially reduced and in which the following steps are accomplished virtually simultaneously in a single piece of equipment: (1) activation of the adhesive properties of the binder; (2) intimate mixing of the activated binder with the fibrous plant material to produce a coherent shapeable mixture; and (3) shaping of the mixture into particles.

It is another object of this invention to provide a process for preparing animal fodder in which moist fibrous plant material can be directly used without first subjecting it to extensive dehydration, and, in many cases, without subjecting it to any dehydration procedures.

It is another object of certain embodiments of this invention to provide a process for preparing an animal fodder in which the moisture required to activate the binder comes only from the inherent moisture content of the original ingredients, as opposed to external sources such as water or steam addition.

These and other objects of this invention will be apparent to one skilled in the art from a consideration of this entire disclosure.

SUMMARY OF THE INVENTION

This invention relates to a readily chewable, easily handled, particulate animal fodder comprising fibrous plant material and a gelatinized binder. Such fodder is prepared, in accordance with the process of this invention, by blending a fibrous plant material, suitable as roughage for a ruminant animal, with a binder which is capable of being gelatinized, but which is in its non-gelatinized condition at the time of blending, and subjecting the blend to conditions of temperature, moisture and pressure effective to gelatinize the binder and simultaneously intimately mix, knead and masticate the fibrous plant material and gelatinized binder into a coherent, fluid, plastic-like mass capable of being shaped into a desired geometric configuration. This fluid mixture of fibrous plant material and gelatinized binder can then be extruded or otherwise shaped or formed into strands or the like which can be cut into moist particles of any suitable size or configuration. The particles are then typically dried to between an 8 and 12 percent moisture level to retard spoilage during storage. The dried particles typically have a bulk density of between about 4 and 30 pounds per cubic foot, are easily chewed by an animal, and retain a high proportion of their nutritive and roughage values during preparation.

The fodder can be formed in any suitable type of mixing apparatus which will effectively gelatinize the binder and intimately mix it with the fibrous plant material to form a coherent shapeable fluid mass. Conventional extrusion type equipment is particularly suitable. Such equipment typically contains (1) an elongated processing chamber containing a rotating auger or worm feed to compact the material in the chamber and advance it through the chamber; (2) a die-plate at the downstream end of the chamber for creating a suitable back pressure in the chamber; (3) means such as a hopper for feeding fibrous plant material and binder, either separately or as a blend, at the upstream end of the chamber; and (4) means such as a steam jacket, for heating the contents of the chamber. Alternatively, the chamber can be equipped with means for injecting moisture into the chamber.

As the fibrous plant material and binder pass through the processing chamber, the conditions present therein cause the binder material to gelatinize and become tacky and adhesive. Simultaneously therewith, the mixing action to which the contents of the chamber are subjected causes the gelatinized binder to intimately mix with and coat the fibrous plant material to form, under the pressure present in the chamber, a coherent, fluid, plastic-type mass which moves through the chamber toward the die-plate. The blend is extruded through the die-plate, typically in the shape of cylindrical strands, which are cut into particles of any desired length.

To insure effective gelatinization of the binder, a certain minimum amount of moisture is desirably present during processing. For example, if the moisture content of the blend of fibrous plant material and binder present in the processing chamber is below about 20 percent by weight, the binder normally does not sufficiently gelatinize to produce the coherent fluid mass of plant material and binder which is desired. On the other hand, if this moisture content exceeds about 75 percent by weight, the blend of plant material and binder may not remain sufficiently viscous and plastic-like to be shaped into an extrudate. In the latter case, the extruder contents can become soupy in consistency and free water which has been pressed out of the mixture may flow through the die-plate. Accordingly, the moisture content of the blend is preferably maintained between about 20 and 75 percent by weight during processing.

The moisture content of the blend can be derived solely from the inherent moisture content of the fibrous plant material and binder. Many of the useful plant materials such as alfalfa and water hyacinth have very high moisture contents when they are initially harvested. With such materials, the moisture content need only be reduced to a range which insures that the moisture content of the blend of plant material and binder be between 20 and 75 percent. In some cases the moisture content of the fibrous plant materials may be such as to provide the desired moisture content in the blend without the need for any dewatering of the plant material. Many of the binders falling within the scope of the invention have relatively low moisture contents on the order of 10 percent or less.

Certain binders gelatinize in the presence of water at lower temperatures while other binders require elevated temperatures. In the latter case, the elevated temperature present in the processing chamber assists in the gelatinization. In the former case, the elevated temperatures, while not required for gelatinization, assist in rendering the contents of the extruder into a viscous cohesive fluid mass suitable for extrusion.

Intimate mixing is accomplished in the processing chamber by the viscous nature of the blend, the forces generated by the worm feed or auger, and the high pressures present.

The processing temperatures, though elevated, are fairly mild so that heat costs are kept low and thermal degradation of the fodder and consequent loss of nutritive values is minimized.

DESCRIPTION OF THE PREFERRED EMBODIMENTS

Equipment

A preferred piece of extrusion type equipment for preparing the fodder particles of this invention is commercially available from Anderson IBEC, Strongsville, Ohio. This equipment is commonly known in the trade as an Anderson "Expander-extruder-cooker." This "Expander-extruder-cooker" is fully described in U.S. Pat. No. 3,222,797 (see in particular FIGS. 1, 6–13 and the disclosure beginning in Column 7, line 36 of the U.S. Pat. No. 3,222,797). The term "Expander-extruder-cooker" as used herein means an apparatus of the general type described in the U.S. Pat. No. 3,222,797.

The Expander-extruder-cooker comprises: (1) a processing chamber with an inlet and outlet; (2) a rotatable interrupted worm flight for advancing material through the processing chamber and for gradually building up pressure within the chamber; (3) a plurality of breaker bolts which extend radially into the chamber from the chamber wall; (4) means for heating the material passing through the chamber; and (5) a die-plate across the outlet to maintain suitable back pressures. As material advances through the chamber, its temperature and pressure are progressively increased.

A unique feature of the Expander-extruder-cooker is that sufficiently high pressure is maintained within the chamber to prevent the moisture present from vaporizing at the temperatures present in the chamber. This is accomplished by preventing the release of the pressure built up within the chamber. Consequently, as wet material is discharged from the chamber through the die-plate, it enters a zone whose pressure is sufficiently low to cause the hot liquid present in the material to rapidly flash or vaporize. In cases where the material is fairly dry to begin with and/or is at a high temperature, the material and residual liquid contains sufficient B.T.U's. to flash some of the residual liquid to vapor in the low pressure zone. Escape of the vaporized liquid causes an expansion of the material to a porous structure (hence the name "Expander-extruder-cooker") which permits continued evaporation of liquid and further drying of the product. This flashing of liquid does not normally occur to any appreciable extent in the present invention because of the relatively high moisture content and low temperature of the mixture of fibrous plant material and binder.

Fibrous Plant Materials

Numerous materials can be used as the fibrous plant materials in this invention. The preferred materials are those portions of plants containing long fibers such as leaves and stems of alfalfa, clovers, grasses, fresh cereal plants (particularly immature ones), low growing leafy plants of any species, plant residues from farming such as tomato and potato plant cuttings after the fruits and tubers have been harvested, leaves from large, woody trees, and aquatic leafy plants, particularly those which must be harvested to clear natural waterways, such as the water hyacinth plant. The fibrous plant material can be fresh from the field or it can be materials which have already been processed such as windrowed alfalfa, corn stalks, grass, dried bales of these materials, residues and waste from other processing techniques, and plant materials stored in silos as ensilage. Also included within the scope of the invention are materials such as paunch manure, a by-product taken from the rumen of slaughtered livestock, or regular manure collected from livestock pens in feed lots, because the fibrous contents of such materials comprise partially digested plant fibers.

The preferred plant materials contain fibers, preferably cellulose fibers, of dimensions required to create optimum digestive conditions in the stomachs of ruminant animals who feed on such fodder. Generally, such fibers should be no shorter than one-sixteenth inch in length and no longer than about 4 inches in length. Preferred fiber lengths range from about ½ to 2 inches. Finely ground plant material is unsuitable because of its poor roughage value. Among the more preferred plant materials are alfalfa and water hyacinth plants.

The moisture content of the plant materials and binder can vary considerably depending not only on the material itself, but also upon the extent to which it has been dried prior to treatment in accordance with this invention. If the resultant moisture content of the blend is less than 20 percent, it is desirable to supply additional moisture to the blend so that its moisture content is maintained between about 20 and 75 percent during processing. This can be accomplished by sufficiently moistening either the fibrous plant material or the binder, or both, before processing. It can also be accomplished by adding water or steam to the blend during processing by injecting water or steam through the walls of the processing chamber of the Expander-extruder-cooker. On the other hand, if the moisture content of the blend of plant material and binder exceeds 75 percent, it can be reduced either by removing moisture from the plant material or by diluting the moisture by the addition of low moisture additives.

One suitable way to reduce moisture under such circumstances is to squeeze the moisture from the plant material under pressure. A preferred method of doing this is to force the plant material to continuously flow through a slotted cylinder with a variable opening discharge port by means of a rotating worm shaft located within the cylinder. The amount of pressure placed upon the plant material is adjusted by varying the discharge opening. The liberated moisture will flow out through the slots. Any other suitable type of dewatering equipment can be used. The juices from the dewatering device can be dehydrated to produce a concentrate which is rich in nutrients which could be used separately from the fodder as a feed concentrate.

The problem of excessively wet plant material or binder can also be solved by thermal drying or any other suitable technique for reducing overall water content such as blending a high moisture component of the blend with a low moisture component.

Binders

The binders useful in the invention comprise any material capable of being gelatinized into a substance which is sufficiently tacky and adhesive to hold the fibrous plant material into a discrete particle. By "gelatinizable" is meant a binder capable of forming a gel, i.e., a colloidal solution of a liquid such as water in the binder material. Such binders include the gelatinizable carbohydrates, which are the preferred binders, the gelatinizable proteins and various gelatinizable mineral or inorganic type binders.

Illustrative carbohydrate binders include such starchy materials as tapioca, wheat, corn, oats, barley, potatoes, or any starchy cereal seed or tuber, as well as the purified starches derived therfrom, whether in the raw state, or modified chemically or by heating, to improve the binding properties after gellation. Other suitable carbohydrates are raw cereal grain, raw whole corn, whole grain sorghum, hominy feed (a by-product from corn flour plants or corn mills) and wheat red dog (a by-product of wheat flouring plants). Preferred carbohydrate binders are starchy cereal grains such as raw whole corn, whole grain sorghum and degerminated corn and wheat flours.

Illustrative proteinaceous binders include naturally occuring gelatinizable proteins such as gluten, similar proteins in other cereal grains, oil seeds, plant leaves and stems, and proteins such as casein in milk products, and the purified and/or modified proteins derived therefrom. Other suitable protein binders are those prepared from proteinaceous residues of plants and animals such as hide glue and flake glue.

Illustrative mineral binders include various silicates such as sodium silicate, bentonite and kaolin, with bentonite representing a preferred mineral binder.

The particle size of the ungelatinized binders are illustratively between 10 and 200 mesh, and preferably smaller than 20 and larger than 60 mesh.

The Blend Of Fibrous Plant Material And Binder

The fibrous plant material and binder can be fed to the processing chamber of the Expander-extruder-cooker either as a pre-mixed blend or as two separate unmixed streams. The amount of binder required for a given blend can vary considerably depending upon such factors as the nature of the plant material and binder and the moisture content of the materials. There need only be employed an amount effective to bind the plant material together. The amount of binder illustratively ranges from about 3 to 50 percent, and preferably from about 20 to 30 percent by weight, based on the dry weight of the blend of fibrous plant material and binder.

A variety of medicinal and nutritive additives and other conventional feed supplements can be incorporated with the plant material or binder, or with the blend of binder and plant material, fed to the Expander-extruder-cooker. Such materials include various vitamins, minerals, antibiotics and other medicines, tenderizing agents, and the like. Generally, such additives would be present in the product in minor amounts on a dry basis.

Processing

As the blend of fibrous plant material and binder passes through the processing chamber of the Expander-extruder-cooker, it is subjected to increasing temperature and pressure. Processing temperatures are illustratively from about 100° to 230°F., and preferably between about 140° and 200°F. Higher temperatures are generally avoided in order to reduce energy costs and prevent water contained in the blend from flashing violently into steam upon being discharged from the Expander-extruder-cooker. Such flashing could produce a product of exceptionally low density and very porous nature with a tendency to easily disintegrate. Temperature assists in gelatinization in the case of some binders and also reduces the viscosity of the coherent fluid mass produced in the processing chamber so as to facilitate mixing and extrusion of the mass. In some cases the mechanical action of the Expander-extruder-cooker alone supplies sufficient heat to obtain the desired temperatures. In other cases, heat from an external source such as a steam jacket or such must be supplied to the blend during processing to achieve the desired temperature.

Pressures within the processing chamber are illustratively about 50 to 1,500 p.s.i., and preferably are between about 200 and 800 p.s.i. Pressures can vary considerably depending upon the product throughput of the Expander-extruder-cooker, the type of the binder and the moisture level of the blend. Generally, higher pressures produce denser fodder particles.

If the moisture content of the plant material and ungelatinized binder fed to the processing chamber of the Expander-extruder-cooker provide the desired moisture content of about 20 to 75 percent within the processing chamber, no additional steps need be taken. However, if the blend in the chamber has a moisture content below about 20 percent, additional water or steam can be injected into the contents of the processing chamber in amounts effective to raise the moisture content of the blend to between about 20 and 75 percent. The Expander-extruder-cooker is adapted for liquid or gas injection into the processing chamber during operation of the device.

The amount of moisture required in the processing chamber can vary considerably within the desired 20 to 75 percent range, depending upon such factors as processing temperatures and the type and amount of binder used. Generally, lower temperatures are preferred when operating at the higher moisture levels and higher temperature when operating at the lower moisture levels. For example, when starch is the binder, and the moisture level of the blend is 20 to 30 percent, higher temperatures are normally used than would be used if the moisture level were about 70 percent. For most applications, the moisture content of the blend is preferably between about 25 and 60 percent.

Once the binder is gelatinized and rendered adhesive, it is then kneaded and masticated mechanically so as to bring it into intimate contact with the plant material. The binder coats the individual particles of plant material which then adhere to each other to form a coherent fluid mass within the Expander-extruder-cooker which is capable of being readily extruded through the die-plate. The processing of the plant material and binder does not substantially alter the desirable roughage characteristics of the plant material.

Illustrative residence times of between about 20 and 60 seconds in the processing chamber of the Expander-extruder-cooker are sufficient to gelatinize the binder and intimately mix it with the forage to form a coherent extrudable fluid mass therein. In many applications, a residence time of between 20 and 40 seconds is acceptable.

The die-plate is normally a perforated plate whose perforations are sized to give extruded strands of the desired diameter. A rotating knife or other suitable means attached to the outside surface of the die-plate cuts the strands into particles of the desired length.

The Fodder Particles

The fodder particles are illustratively cylindrical in shape and have a diameter of between three-eighths and nine-sixteenths of an inch and a length of between 1 and 2 inches. They are porous, quite chewy, and have illustrative bulk densities after drying of between about 4 and 30 pounds per cubic foot. In many cases, the density of the particles is from about 8 to 12 pounds per cubic foot. Bulk density is a function of numerous factors such as the nature of additional additives present in the particle and the operating pressure in the Expander-extruder-cooker. The fodder particles have a high nutritive level and excellent roughage characteristics.

The moisture content of the fodder when it is initially formed in normally high and must be reduced to prevent the fodder from spoiling during storage. It is generally known that if the moisture content exceeds about 12 percent, most natural materials will mold during storage. On the other hand, if the moisture content is lowered below 8 percent, the material tends to absorb water from the air. Consequently, the fodder would normally be dried to a moisture content of around 10 percent. This is illustratively done in an apron type hot air dryer using air temperatures of between 160° and 260°F., and preferably between 180° and 200°F.

If desired, the fodder particles of this invention can be compressed to higher bulk densities using conventional compressing and compacting equipment, such as baling presses.

The following examples are provided to further illustrate the invention.

EXAMPLE 1

A quantity of cut alfalfa (2 to 6 inches in length) was dewatered in a continuous mechanical screw press from an intial moisture content of 80–85 percent to about 60 percent. The dewatered alfalfa was blended with 25 percent by weight (dry basis) of ungelatinized yellow corn flour having a moisture content of about 10 percent. This mixture, having a moisture content of about 55 percent, was subsequently fed to the heated processing chamber of an Anderson IBEC "Expander-extruder-cooker" of the type described in U.S. Pat. No. 3,222,797 where it was subjected to intimate mixing at a temperature of about 130° to 150°F. and a pressure of 200 to 225 p.s.i. for about 30 seconds. Under the influence of heat supplied by the mechanical action of the screw, the corn flour was gelatinized in the presence of the moisture present in the blend into a tacky binder. The gelatinized flour mixed with the alfala cuttings changed the mixture of discrete alfalfa cuttings and corn flour into a continuous coherent fluid matrix. This matrix was readily extruded through circular openings in the die-plate at the downstream end of the chamber at a rate of about 226 pounds of wet product per hour. Wet cylindrical particles were formed at the extruder die by means of a rotating cutter knife. These particles were thermally dried to yield a strong storable fodder which could be readily handled but which remained readily chewable. The fodder retained the fibrous structure of the fresh alfalfa and were of high nutritive value. The roughage characteristics of the fodder were superior to those of bales or cubed alfalfa.

EXAMPLE 2

A quantity of first cutting alfalfa of high quality was fresh chopped to 1 to 4 inch lengths and dewatered from 80–82 percent to 70 percent moisture in a continuous mechanical screw press. The pressed alfalfa was pre-mixed in a blender with ungelatinized raw yellow corn flour containing about 10 percent moisture to provide the following binder levels (on a dry basis): 25 percent; 13.7 percent; 5.7 percent; and 2.9 percent. The resultant blends were fed to an Expander-extruder-cooker and processed therein substantially as in Example 1 except that the moisture content of the blends generally fell between about 65–70 percent, processing temperature was about 175°–200°F. and processing pressure was about 80 to 100 p.s.i. The output rate of wet product from each run was as follows:

| % corn flour | pounds/hour |
| --- | --- |
| 25 | 330 |
| 13.7 | 320 |
| 5.7 | 340 |
| 2.9 | 510 |

The products from each run contained the masticated residue of leaves and stem particles, plus a significant quantity of the desired stem and the fiber strands in lengths of ½ to 1½ inches, all bound together into a firm particle by the gelatinized corn flour. After drying, each particle displayed the attractive green color of fresh alfalfa. It was found that corn flour levels of 25 and 13.7 percent made firm particles, corn flour levels of 5.7 percent made more loosely agglomerated though again still acceptable, particles, and corn flour at a level of 2.9 percent made even more loosely, though again still acceptable, particles. The bulk densities of the various dried fodders ranged from about 4.6 to 10.2 pounds per cubic foot, generally increasing as binder level increased.

EXAMPLE 3

A quantity of the pressed alfalfa as generally described in Example 2 was processed as in Example 1 except the corn flour was replaced by 8.1 percent (dry basis) wheat flour. The moisture content of the blend was about 55 percent. Processing conditions were about 230°F., a pressure of about 120 p.s.i., a residence time of 30 seconds and a rate of output of wet product of about 460 pounds per hour. An excellent fodder of high nutritive value was produced.

EXAMPLE 4

A quantity of first cutting alfalfa of high quality was fresh chopped to 1 to 4 inch lengths and partially dried to 60 percent moisture in an air dryer with air temperatures of less than 200°F. The partially dried alfalfa was then mixed in a blender into two batches: one batch contained about 20 percent by weight (dry basis) of ungelatinized raw corn flour, and the other about 20 percent by weight of ungelatinized wheat flour. Both batches were processed as in Example 1 except the moisture content of each blend was about 57 percent. The blends were processed at temperatures of about 220°F. and pressures of about 150 to 220 p.s.i. for about 30 seconds. In each run the fodder produced was of excellent quality.

EXAMPLE 5

A quantity of late summer, poor quality alfalfa, containing 50 percent grass and weeds, was field chopped to 1 to 4 inch lengths. Since it was harvested late in the season it contained 65 to 68 percent moisture when cut. The alfalfa was fed, "as is" into an Expander-extruder-cooker, along with a separate stream of ungelatinized ground whole corn in such ratio that the fodder would contain 50 percent corn and 50 percent alfalfa on an oven dry basis. The blend was then processed as in Example 1 at temperatures of 104° to 120°F. and pressures of 125 to 150 p.s.i. for 30 seconds. The moisture content of the blend was about 45 percent. Water was injected into the blend through the walls of the processing chamber of the Expander-extruder-cooker at a rate of about 150 pounds per hour until the water content of the blend rose to about 56 percent. The rate of output of wet product was 1160 pounds per hour. The fodder was subsequently dried in a hot air dryer at air temperatures below 200°F. The resultant acceptable fodder particles were ½ inch in diameter, and 1½ inch long and contained significant amounts of fiber strands.

The run was repeated two more times as above, except no external water injection was used in either of these two runs and the blend moisture content and output rate of wet product were varied. In one run, the blend moisture content was 46 percent with an output rate of 830 pounds per hour, and in the other run, it was 45 percent with an output of 730 pounds per hour. In each case, satisfactory dried fodder particles were obtained.

EXAMPLE 6

A quantity of alfalfa ensilage containing about 65 percent moisture which had been stored in a silo over the winter, was fed into an Expander-extruder-cooker, along with a separate stream of ungelatinized ground whole corn in substantially the same manner as in Example 5. The ratio of the two feed streams was adjusted to result in pellets containing 20 percent corn on a dry basis. The corn had a moisture content of about 10 percent. The moisture content of the blend was about 60 percent. The blend was then processed at temperatures of about 170° to 200°F. and pressures of 300 to 400 p.s.i. for 30 seconds. The wet product output rate was 780 pounds per hour. During processing, steam was injected into the processing chamber at a rate of 25 pounds per hour until the moisture level of the blend rose to about 65–70 percent. The resulting wet fodder was dried in a hot air dryer at air temperatures below 200°F. An excellent product was obtained similar to the product obtained from Example 5. The bulk density of the dried fodder was about 15 pounds per cubic foot.

EXAMPLE 7

Water hyacinth plants containing about 94 percent moisture were dewatered to a moisture level of 75 percent. The dewatered hyacinth was fed to the processing chamber of an Expander-extruder-cooker while a second separate stream of ungelatinized ground whole corn was also fed to the chamber at the rate required to achieve the desired binder level in the finished product. Three separate runs were carried out in this manner in which the binder level and processing conditions were varied. The resulting fodder was dried as in Example 6. Processing parameters and results are tabulated below:

| | Run 1 | Run 2 | Run 3 |
| --- | --- | --- | --- |
| temperature (°F) | 200–230 | 170–180 | 180–190 |
| pressure (p.s.i.) | 100–200 | 100–200 | 100–200 |
| residence time (sec.) | 30 | 30 | 30 |
| % corn in blend (dry basis) | 4 | 4 | 19 |
| moisture content of blend (%) | 72.5 | 68.5 | 67.5 |
| wet product output rate (lb/hr) | 300 | 300 | 300 |
| dried fodder bulk density (lb/ft³) | 5 | 20 | 20 |

In all cases, satisfactory fodder particles were prepared.

The above examples and other specific data are illustrative only and such alterations and modifications thereof as would be apparent to one skilled in the art are deemed to fall within the scope and spirit of the claims appended hereto, the invention being defined only by these claims.

What is claimed is:

1. A process for producing a ruminant animal fodder in a single piece of processing equipment which comprises introducing into the processing chamber of an extruder type device:
   1. fibrous plant material suitable as roughage for a ruminant animal, and selected from the group consisting of alfalfa, clover, grasses, water hyacinth, cereal plants, low growing leafy plants, plant residues from farming, leaves from large woody trees, aquatic leafy plants, corn stalks, ensilage, regular manure and paunch manure; and
   2. a gelatinizable binder selected from the group consisting of:
      a. a starchy material selected from the group consisting of tapioca, wheat, wheat flour, degerminated wheat flour, corn, corn flour, degerminated corn flour, oats, barley, potatoes, cereal seeds, cereal tubers, cereal grain, raw whole corn, whole grain sorghum, hominy feed, wheat red dog, and starches and modified starches derived from such starchy materials;
      b. proteinaceous materials selected from the group consisting of glutens, proteins in cereal grains, oil seeds, plant leaves and stems, milk product proteins, proteinaceous residues of plants and animals such as hide glue and flake glue, and proteins and modified proteins derived from such proteinaceous materials; and
      c. minerals selected from the group consisting of silicates, bentonite and kaolin;

said binder being introduced in its non-gelatinized condition and in an amount representing from about 3 to 50 weight percent of the mixture of plant material and binder on a dry basis, the resulting mixture consisting essentially of fibrous plant material and gelatinizable binder, said mixture containing at least about 50 weight percent of fibrous plant material and having a moisture content of about 20 to 75 percent and, without introducing additional moisture into said chamber, subjecting the mixture of plant material and binder to a temperature between about 100° and 230° F. and a pressure between about 50 and 1,500 p.s.i. in the chamber, without permitting the temperature of the mixture to rise above about 230° F. in the chamber, to gelatinize the binder in the chamber in the presence of the fibrous plant material and mix the plant material with the gelatinized binder to form an extrudable fluid mass within the chamber, and extruding the fluid mass to form the fodder, without flashing to vapor substantial amounts of the liquid associated with said fluid mass, thereby producing a fodder product which is in a substantially non-expanded condition.

2. The process of claim 1 wherein said moisture content is between about 25 and 60 percent, the temperature is between about 140° and 200°F., and the pressure is between about 200 and 800 p.s.i.

3. The process of claim 1 wherein the binder is a starchy material.

4. A process for producing a ruminant animal fodder in a single piece of processing equipment which comprises introducing into the processing chamber of an extruder type device:
   1. fibrous plant material suitable as roughage for a ruminant animal, and selected from the group consisting of alfalfa, clover, grasses, water hyacinth, cereal plants, low growing leafy plants, plant residues from farming, leaves from large woody trees, aquatic leafy plants, corn stalks, ensilage, regular manure and paunch manure; and
   2. a gelatinizable binder selected form the group consisting of:
      a. a starchy material selected from the group consisting of tapioca, wheat, wheat flour, degerminated wheat flour, corn, corn flour, degerminated corn flour, oats, barley, potatoes, cereal seeds, cereal tubers, cereal grain, raw whole corn, whole grain sorghum, hominy feed, wheat red dog, and starches and modified starches derived from such starchy materials;
      b. proteinaceous materials selected from the group consisting of glutens, proteins in cereal grains, oil seeds, plant leaves and stems, milk product proteins, proteinaceous residues of plants and animals such as hide glue and flake glue, and proteins and modified proteins derived from such proteinaceous materials; and
      c. minerals selected from the group consisting of silicates, bentonite and kaolin;

said binder being introduced in its non-gelatinized condition and in an amount representing from about 3 to 50 weight percent of the mixture of plant material and binder on a dry basis, the resulting mixture consisting essentially of fibrous plant material and gelatinizable binder, said mixture containing at least about 50 weight percent of fibrous plant material, injecting moisture into said chamber from a source external to the chamber to raise the moisture level of said mixture to between about 20 and 75 percent, treating the moistened mixture at temperatures of about 100° to 230° F. and pressures of about 50 to 1,500 p.s.i., without permitting the temperature to rise above about 230° F. in the chamber, to gelatinize the binder in the chamber in the presence of the fibrous plant material and mix the fibrous plant material with the gelatinized binder to form a fluid mass within the chamber, and extruding the fluid mass to form the animal fodder, without flashing to vapor substantial amounts of the liquid associated with said fluid mass, thereby producing a fodder product which is in a substantially non-expanded condition.

5. The process of claim 4 wherein the binder is a starchy material.

6. A process for producing a ruminant animal fodder in a single piece of processing equipment which comprises introducing into an extruder type device:
   1. fibrous plant material suitable as roughage for a ruminant animal, and selected from the group consisting of alfalfa and water hyacinth plants; and
   2. a starchy gelatinizable binder selected from the group consisting of tapioca, wheat, wheat flour, degerminated wheat flour, corn, corn flour, degerminated corn flour, oats, barley, potatoes, cereal seeds, cereal tubers, cereal grain, raw whole corn, whole grain sorghum, hominy feed, wheat red dog, and starches and modified starches derived from such starchy materials;

said binder constituting from about 3 to 50 weight percent of the mixture of fibrous plant material and binder on a dry basis, the resulting mixture consisting essentially of fibrous plant material and gelatinizable binder, said mixture containing at least about 50 weight percent of fibrous plant material and having a moisture content of from about 20 to 75 percent, and treating the mixture of fibrous plant material and binder in the extruder type device at temperatures between about 100° and 230° F., and pressures between about 50 and 1,500 p.s.i., without permitting the temperature to rise above about 230° F. in the extruder, to gelatinize the binder in the presence of the fibrous plant material and mix the fibrous plant material with the gelatinized binder to form in said chamber a fluid mass, and extruding the fluid mass, without flashing to vapor substantial amounts of the liquid associated with said fluid mass, thereby producing a fodder product which is in a substantially non-expanded condition.

7. The process of claim 6 wherein the temperature is about 140° to 200° F. and the pressure is about 200 to 800 p.s.i.

8. The process of claim 6 wherein the moisture content of the blend is about 45 to 70 percent.

9. A particulate, chewable, ruminant animal fodder consisting essentially of a fibrous plant material and a gelatinized binder wherein the fibrous plant material is held together by the gelatinized binder and wherein:
  1. the fibrous plant material is suitable as roughage for a ruminant animal, and is selected from the group consisting of alfalfa, clover, grasses, water hyacinth, cereal plants, low growing leafy plants, plant residues from farming, leaves from large woody trees, aquatic leafy plants, corn stalks, ensilage, regular manure and paunch manure; and
  2. the gelatinized binder is selected from the group consisting of:
      a. a starchy material selected from the group consisting of tapioca, wheat, wheat flour, degerminated wheat flour, corn, corn flour, degerminated corn flour, oats, barley, potatoes, cereal seeds, cereal tubers, cereal grain, raw whole corn, whole grain sorghum, hominy feed, wheat red dog, and starches and modified starches derived from such starchy materials;
      b. proteinaceous materials selected from the group consisting of glutens, proteins in cereal grains, oil seeds, plant leaves and stems, milk product proteins, proteinaceous residues of plants and animals such as hide glue and flake glue, and proteins and modified proteins derived from such proteinaceous materials; and
      c. minerals selected from the group consisting of silicates, bentonite and kaolin;

said binder present in an amount representing from about 3 to 50 weight percent of the mixture of plant material and binder on a dry basis, the fodder containing at least about 50 weight percent of fibrous plant material, and further characterized by being in a substantially non-expanded condition and having a bulk density of about 4 to 30 pounds per cubic foot.

10. The fodder of claim 9 wherein the fibrous plant material is selected from the group consisting of alfalfa and water hyacinth plants, and wherein the binder is a starchy material.

11. A particulate, chewable, ruminant animal fodder consisting essentially of a fibrous plant material and from about 3 to 50 percent on a dry basis of a gelatinized binder wherein the fibrous plant material is held together by the gelatinized binder, and wherein:
  1. the fibrous plant material is suitable as roughage for a ruminant animal, and is selected from the group consisting of alfalfa, clover, grasses, water hyacinth, cereal plants, low growing leafy plants, plant residues from farming, leaves from large woody trees, aquatic leafy plants, corn stalks, ensilage, regular manure and paunch manure; and
  2. the gelatinized binder is selected from the group consisting of:
      a. a starchy material selected from the group consisting of tapioca, wheat, wheat flour, degerminated wheat flour, corn, corn flour, degerminated corn flour, oats, barley, potatoes, cereal seeds, cereal tubers, cereal grain, raw whole corn, whole grain sorghum, hominy feed, wheat red dog, and starches and modified starches derived from such starchy materials;
      b. proteinaceous materials selected from the group consisting of glutens, proteins in cereal grains, oil seeds, plant leaves and stems, milk product proteins, proteinaceous residues of plants and animals such as hide glue and flake glue, and proteins and modified proteins derived from such proteinaceous materials; and
      c. minerals selected from the group consisting of silicates, bentonite and kaolin;

the fodder containing at least about 50 weight percent of said fibrous plant material, and further characterized by being in a substantially non-expanded condition and having a bulk density of about 8 to 12 pounds per cubic foot.

12. The fodder of claim 11 wherein the fibrous plant material is selected from the group consisting of alfalfa and water hyacinth plants, and wherein the binder is a starchy material.

13. A process for producing a ruminant animal fodder in a single piece of processing equipment which comprises bringing together in a processing chamber thereof:
  1. fibrous plant material suitable as roughage for a ruminant animal and selected from the groups consisting of alfalfa, clover, grasses, water hyacinth, cereal plants, low growing leafy plants, plant residues from farming, leaves from large woody trees, aquatic leafy plants, corn stalks, ensilage, regular manure and paunch manure; and
  2. a gelatinizable binder selected from the group consisting of:
      a. a starchy material selected from the group consisting of tapioca, wheat, wheat flour, degerminated wheat flour, corn, corn flour, degerminated corn flour, oats, barley, potatoes, cereal seeds, cereal tubers, cereal grain, raw whole corn, whole grain sorghum, hominy feed, wheat red dog, and starches and modified starches derived from such starchy materials;
      b. proteinaceous materials selected from the group consisting of glutens, proteins in cereal grains, oil seeds, plant leaves and stems, milk product proteins, proteinaceous residues of plants and animals such as hide glue and flake glue, and proteins and modified proteins derived from such proteinaceous materials; and c. minerals selected from the group consisting of silicates, bentonite and kaolin;

the binder being in a substantially non-gelatinized condition and present in an amount representing about 3 to 50 weight percent of the mixture of plant material and binder on a dry basis, the resulting mixture consisting essentially of fibrous plant material binder, said mixture containing at least about 50 weight percent of said fibrous plant material and having a moisture content of about 20 to 75 percent, and subjecting the mixture to a temperature of about 100° to 230° F. and a pressure of about 50 to 1,500 p.s.i., without permitting the temperature of the mixture to rise above about 230° F., to gelatinize the binder in the presence of the fibrous plant material and mix the plant material with the gelatinized binder to form a fluid, shapeable mass, and shaping said mass to form the animal fodder, without flashing to vapor substantial amounts of the liquid associated with said fluid mass, thereby producing a fodder which is in a substantially non-expanded condition.

14. The process of claim 13 wherein the fibrous plant material and binder are mixed in the processing chamber of an extruder type device.

15. The process of claim 13 wherein the temperature is about 140° to 200° F. and the pressure is about 200 to 800 p.s.i.

16. The process of claim 13 wherein the binder is a cereal grain.

17. The process of claim 13 wherein the moisture content of the mixture is about 25 to 70 percent.

18. The process of claim 13 wherein the moisture content of the mixture is about 45 to 75 percent.

19. The process of claim 13 wherein the temperature is about 140° to 200° F., the pressure is about 200 to 800 p.s.i., the moisture content of the mixture is about 45 to 70 percent, and the binder is a starchy material.

20. The process of claim 13 wherein the fibrous plant material is alfalfa, the temperature is about 140° to 200° F., and the moisture content of the blend is about 45 to 70 percent.

* * * * *